(12) United States Patent
Hattori

(10) Patent No.: US 12,613,369 B2
(45) Date of Patent: Apr. 28, 2026

(54) LIGHT EMITTING EMBLEM

(71) Applicant: KABUSHIKI KAISHA TOKAI-RIKA-DENKI-SEISAKUSHO, Aichi-ken (JP)

(72) Inventor: Tomomi Hattori, Aichi (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 0 days.

(21) Appl. No.: 19/036,348

(22) Filed: Jan. 24, 2025

(65) Prior Publication Data

US 2025/0244521 A1 Jul. 31, 2025

(30) Foreign Application Priority Data

Jan. 26, 2024 (JP) ................................. 2024-010573

(51) Int. Cl.
*F21V 8/00* (2006.01)
(52) U.S. Cl.
CPC ............. *G02B 6/006* (2013.01); *G02B 6/002* (2013.01)
(58) Field of Classification Search
CPC .............................. G02B 6/006; B60R 13/005
See application file for complete search history.

(56) References Cited

U.S. PATENT DOCUMENTS

| | | | | |
|---|---|---|---|---|
| 9,151,461 | B1 * | 10/2015 | Kuo ......................... | F21S 43/26 |
| 2004/0096182 | A1 * | 5/2004 | Yamashita ........... | G02B 6/0038 |
| | | | | 385/146 |
| 2012/0321290 | A1 * | 12/2012 | Daijo ................... | G02B 6/0018 |
| | | | | 396/200 |
| 2014/0362588 | A1 * | 12/2014 | Wu ...................... | F21S 43/315 |
| | | | | 362/327 |
| 2017/0043709 | A1 | 2/2017 | Dellock et al. | |
| 2017/0355302 | A1 * | 12/2017 | Kuramitsu ............. | G02B 6/002 |
| 2021/0172579 | A1 * | 6/2021 | Tsuchiya ................. | F21S 43/33 |
| 2023/0250941 | A1 * | 8/2023 | Arai ...................... | G09F 21/048 |
| | | | | 362/546 |

* cited by examiner

*Primary Examiner* — Christopher E Dunay
(74) *Attorney, Agent, or Firm* — Dority & Manning, PA

(57) ABSTRACT

A light emitting emblem, including: a light source; a light guide that guides light irradiated from the light source; and an outer lens that emits light by transmitting light irradiated from the light guide, wherein: the light guide is provided with a first reflection face that reflects light from the light source passing through an inner peripheral portion of the light guide for transmission through an inner peripheral portion of the outer lens, and a second reflection face that is provided at a position different from that of the first reflection face and that reflects light from the light source passing through an outer peripheral portion of the light guide for transmission through an outer peripheral portion of the outer lens; the light guide is provided with a tapered face; and the tapered face configures the first reflection face and the second reflection face.

4 Claims, 3 Drawing Sheets

LIGHT EMITTING EMBLEM

CROSS-REFERENCE TO RELATED APPLICATION

This application is based on and claims priority under 35 USC 119 from Japanese Patent Application No. 2024-010573, filed on Jan. 26, 2024, the entire disclosure of which is incorporated by reference herein.

BACKGROUND

Technical Field

The present disclosure relates to a light emitting emblem.

Related Art

An emblem (badge) provided to a front section of a vehicle is disclosed in the specification of United States Patent Application Publication No. 2017/0043709. The emblem described therein is configured including a visible portion containing a mark, plural first LED light sources configured so as to emit light toward the visible portion, a light guide that extends between the visible portion and the first LED light sources, and plural second LED light sources configured so as to emit light toward the visible portion. The first LED light sources illuminate a first region of the visible portion, and the second LED light sources illuminate a second region of the visible portion. The first LED light sources are disposed below the mark, and are configured so as to emit light through the mark when illuminated. This accordingly enables provision of a unique and attractive visual experience from illumination generated by using plural light sources.

However, there is a desire to be able to reduce the number of light sources such as LEDs from the perspective of making an emblem thinner and of effectively utilizing space inside the emblem, and the configuration described in the specification of the United States Patent Application Publication No. 2017/0043709 has room for improvement from this perspective.

SUMMARY

The present disclosure provides a light emitting emblem enabling the number of light sources to be reduced.

A light emitting emblem according to a first aspect includes a light source, a light guide that guides light irradiated from the light source, and an outer lens that emits light by transmitting light irradiated from the light guide. The light guide is provided with a first reflection face that reflects light from the light source passing through an inner peripheral portion of the light guide for transmission through an inner peripheral portion of the outer lens, and a second reflection face that is provided at a position different from that of the first reflection face and that reflects light from the light source passing through an outer peripheral portion of the light guide for transmission through an outer peripheral portion of the outer lens. The light guide is provided with a tapered face that narrows on progression toward a light source side, and part of the tapered face configures the first reflection face, and another part of the tapered face configures the second reflection face.

A light emitting emblem according to a second aspect is the light emitting emblem of the first aspect, wherein a mask is provided between the outer lens and the light guide to prevent transmission of light from a second range of the outer lens which is different from a first range of the outer lens, and an undulating-profile portion is provided at a site on the light guide facing the first range to reflect light, which has been reflected at the first reflection face, toward an outer lens side.

A light emitting emblem according to a third aspect is the light emitting emblem of the first aspect or the second aspect, wherein light from a single one of the light source is guided in the light guide.

A light emitting emblem according to a fourth aspect is the light emitting emblem of the third aspect, wherein the light source is disposed at a position corresponding to a centroid of the outer lens when viewed from an outer lens side.

A light emitting emblem according to a fifth aspect is the light emitting emblem of the fourth aspect, wherein a mask is provided between the outer lens and the light guide to prevent transmission of light from a second range of the outer lens which is different from a first range of the outer lens, and the light source is disposed at a position corresponding to the second range when viewed from the outer lens side.

In the light emitting emblem according to the first aspect, light irradiated from the light source is guided by the light guide. Part of the light of the light source guided by the light guide, reflected by the first reflection face and passing through an inner peripheral portion of the light guide is for transmission through an inner peripheral portion of the outer lens. Furthermore, another portion of light of the light source guided by the light guide, reflected by the second reflection face and passing through an outer peripheral portion of the light guide is for transmission through an outer peripheral portion of the outer lens. This configuration is able to eliminate a need to provide both a light source to obtain the light to be emitted at the inner peripheral portion of the outer lens and a separate light source to obtain the light to be emitted at the outer peripheral portion of the outer lens. The number of light sources can be reduced as a result thereof. Moreover, in the light emitting emblem according to the first aspect, light irradiated from the light source is guided by the light guide. Moreover, part of the light of the light source guided by the light guide, reflected at the first reflection face of the tapered face of the light guide and passing through an inner peripheral portion of the light guide is for transmission through an inner peripheral portion of the outer lens. Furthermore, another part of the light of the light source guided by the light guide, reflected at the second reflection face of the tapered face of the light guide and passing through an outer peripheral portion of the light guide is for transmission through an outer peripheral portion of the outer lens. This configuration is able to eliminate a need to provide both a light source to obtain the light to be emitted at the inner peripheral portion of the outer lens and a separate light source to obtain the light to be emitted at the outer peripheral portion of the outer lens. The number of light sources can be reduced as a result thereof.

In a light emitting emblem according to the second aspect, a mask is provided between the outer lens and the light guide to prevent transmission of light from the second range of the outer lens which is different from the first range of the outer lens. The undulating-profile portion is provided at a site on the light guide facing the first range to reflect light that has been reflected at the first reflection face toward the outer lens side. This configuration is able to suppress generation of uneven brightness in light transmitted at the first range of the outer lens compared to a configuration in which an undulating-profile portion is not formed at a site facing the first range of the light guide.

The light emitting emblem according to the third aspect enables light to be emitted at the inner peripheral portion of the outer lens and the outer peripheral portion of the outer lens by a single light source.

In the light emitting emblem according to the fourth aspect, the light source is disposed at a position corresponding to the centroid of the outer lens when viewed from the outer lens side. This configuration is able to suppress generation of uneven brightness in light transmitted at a position of the outer lens distanced from the light source compared to configurations in which the light source is provided at a different position to the position described above.

In the light emitting emblem according to the fifth aspect, the mask is provided between the outer lens and the light guide to prevent transmission of light from the second range of the outer lens which is different from the first range of the outer lens. Moreover, the light source is disposed at a position corresponding to the second range are viewed from the outer lens side. This configuration is able to suppress light from the light source from being seen directly from the outer lens side. Namely, the portion corresponding to the light source as viewed from the outer lens side can be suppressed from appearing as a bright flash.

BRIEF DESCRIPTION OF THE DRAWINGS

Exemplary embodiments of the present disclosure will be described in detail based on the following figures, wherein.

DETAILED DESCRIPTION

Figure 1:
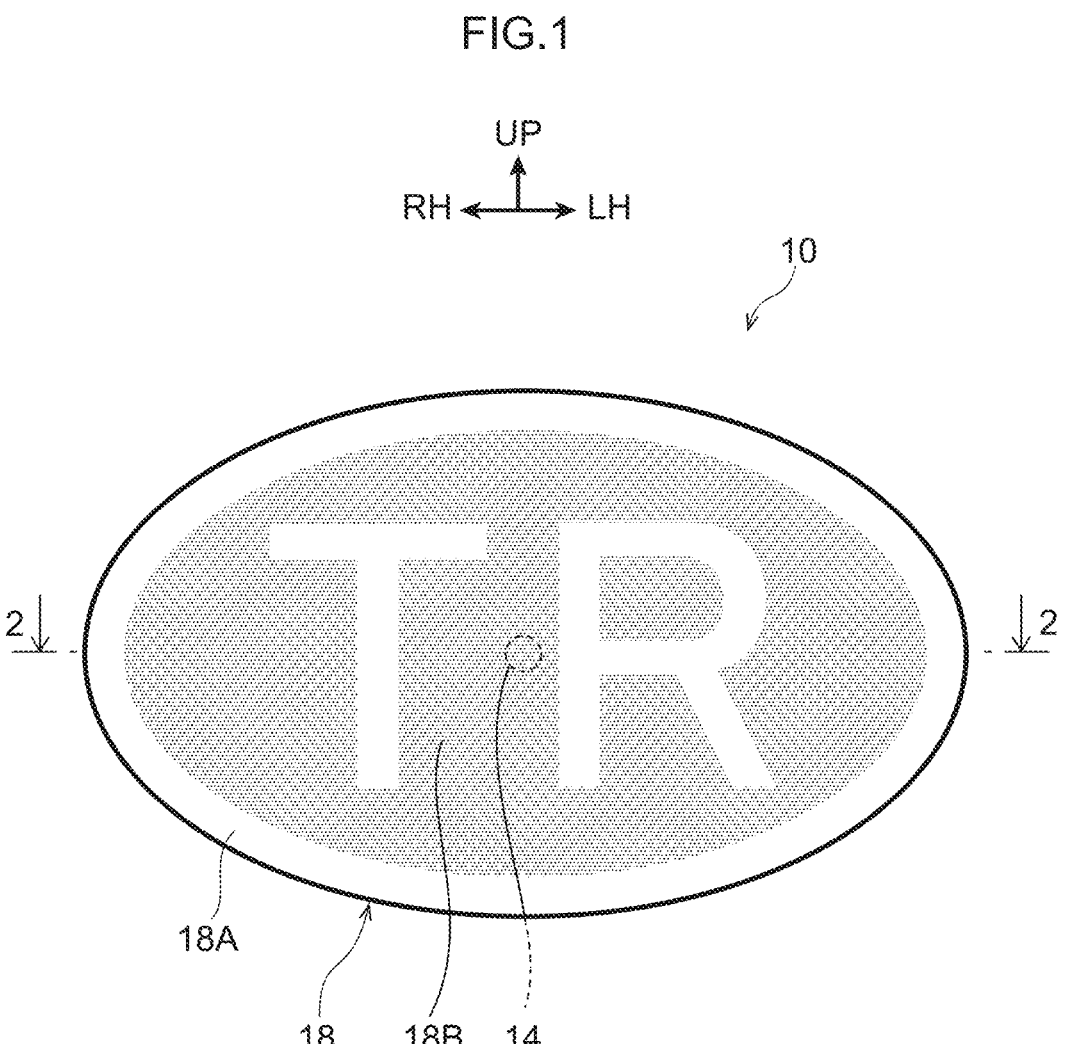
FIG. 1 is a face-on view illustrating a light emitting emblem of an exemplary embodiment.

A light emitting emblem 10 of the present exemplary embodiment is illustrated in FIG. 1. As illustrated in the drawings, the light emitting emblem 10 of the present exemplary embodiment is configured to emit light such that light for transmission through an outer peripheral portion 18A of an outer lens 18, described later, depicts an elliptical ring shape, and to emit light such that light for transmission through an inner peripheral portion 18B of the outer lens 18 depicts the characters "TR". Note that the arrow FR and arrow UP in the drawings respectively indicate a front side and an upper side of the light emitting emblem 10. Moreover, the arrow RH and the arrow LH in the drawings respectively indicate a right side and a left side of the light emitting emblem 10. Hereafter, unless explicitly stated otherwise, reference in the description simply to front and rear, up and down, and left and right directions indicate front and rear in the front and rear direction of the light emitting emblem 10, up and down in the height direction of the light emitting emblem 10, and left and right in the left and right direction of the light emitting emblem 10.

Figure 2:
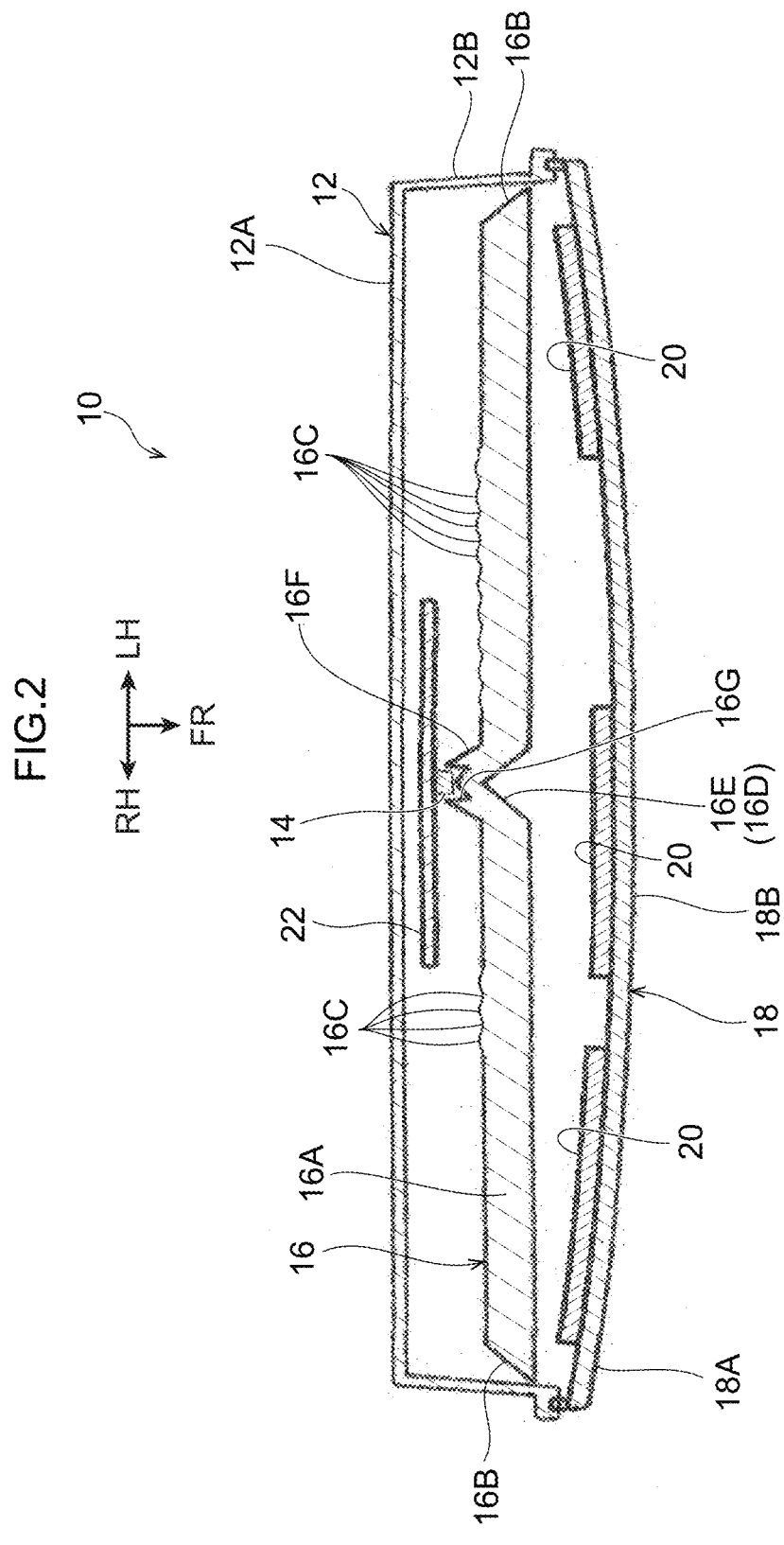
FIG. 2 is a cross-section illustrating a light emitting emblem sectioned along line 2-2 of FIG. 1.

As illustrated in FIG. 1 and FIG. 2, the light emitting emblem 10 is configured including a housing 12, a single light source 14 and a light guide 16 provided inside the housing 12, an outer lens 18 attached to the housing 12, and a mask 20 formed to the outer lens 18.

The housing 12 is, as an example, formed from a resin material in a box shape with an open front side. The housing 12 includes a bottom wall portion 12A that has a thickness direction along the front-rear direction and that extends in both the height direction and the left-right direction, and a side wall portion 12B that extends from an outer peripheral edge of the bottom wall portion 12A toward the front side.

The light source 14 is, as an example, an LED or the like that emits light on being switched on, and that is attached to a base plate 22. The light source 14 is supported by the housing 12 due to the base plate 22 being fixed to the housing 12.

Figure 3:
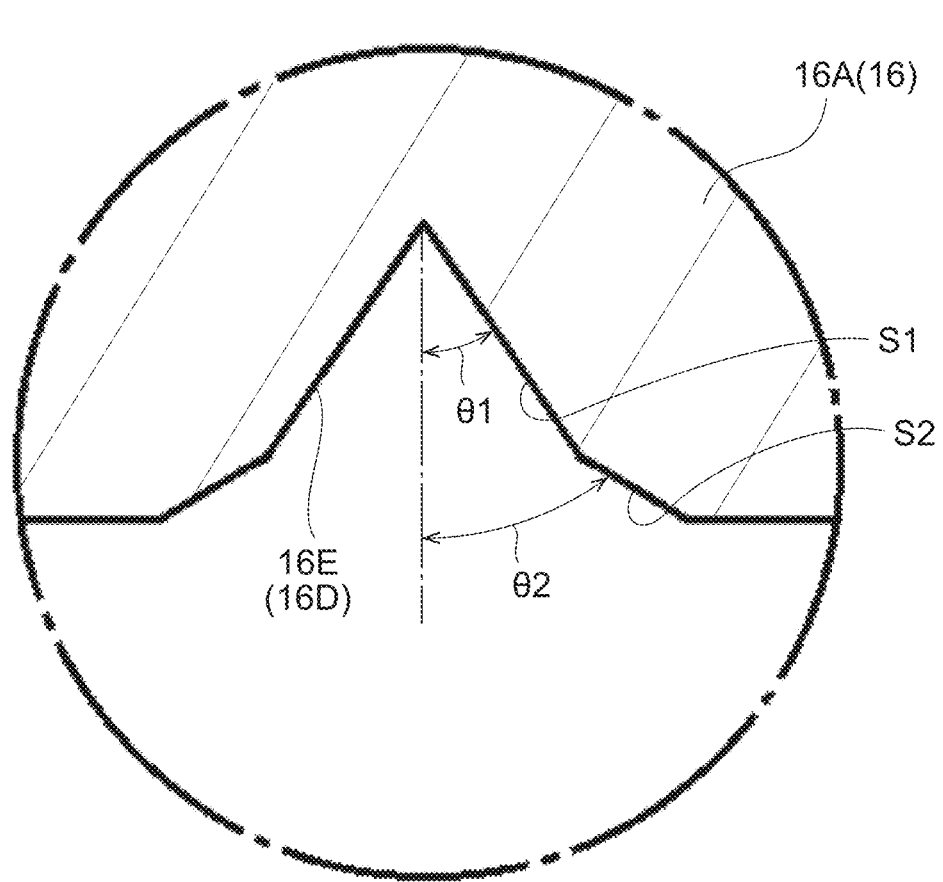
FIG. 3 is a cross-section schematically illustrating a taper indentation formed to a light guide main body.

The light guide 16 is, as an example formed from a transparent resin material, and guides light irradiated from the light source 14. The light guide 16 includes a light guide main body 16A formed in a plate shape having a thickness direction in the front-rear direction. The light guide main body 16A is formed with an outer edge profile that configures an elliptical shape when viewed from the front side. The outer peripheral face of the light guide main body 16A is configured by an inclined face 16B that is inclined toward the opposite side to the center of the light guide main body 16A (centroid when viewed from the front side) on progression toward the front side. An undulating-profile portion 16C is also formed in a defined range on the face on the rear side of the light guide main body 16A, with the portion 16C functioning as reflection steps to reflect light from the light source 14 toward the front side. The undulating-profile portion 16C is formed by slits and hollows, protrusions, indentations, and the like disposed at a separation from each other in the left-right direction and the front-rear direction. In the present exemplary embodiment, the undulating-profile portion 16C is formed so as to depict the characters "TR" when the light guide 16 is viewed from the front. A taper indentation 16D is also formed at the center of the light guide main body 16A (on an extension line of the light source 14 at the centroid when viewed from the front side), with the taper indentation 16D open at the front side. An inner peripheral face of the taper indentation 16D is configured by a tapered face 16E having a funnel shape that narrows on progression from the front side toward the rear side. As illustrated in FIG. 2 and FIG. 3, sites at a rear side of the tapered face 16E configure a first reflection face S1. An angle $\theta 1°$ is formed between the first reflection face S1 and the front-rear direction. Sites at the front side of the tapered face 16E configure a second reflection face S2. An angle $\theta 2°$, greater that $\theta 1°$, is formed between the second reflection face S2 and the front-rear direction. Note that in FIG. 3 a difference between the angle $\theta 1°$ formed between the first reflection face S1 and the front-rear direction and the angle $\theta 2°$ formed between the second reflection face S2 and the front-rear direction is illustrated in an exaggerated manner. The surface area of the first reflection face S1 and the surface area of the second reflection face S2 are different surface areas. Specifically, the surface area of the first reflection face S1 is greater than the surface area of the second reflection face S2 in the first exemplary embodiment.

As illustrated in FIG. 2, the light guide 16 includes a central projection 16F that projects toward the rear side from a center of the light guide main body 16A (centroid when viewed from the front side). A light source placement indentation 16G indented toward the front side is formed at a projection direction leading end side of the central projection 16F. The light source 14 is configured so as to be disposed inside the light source placement indentation 16G.

The light guide 16 configured as described above is supported by the housing 12 further to the front side than the light source 14.

As illustrated in FIG. 1 and FIG. 2, the outer lens 18 is, for example, formed from a transparent resin material, and is configured such that a defined range thereof emits light by transmitting light illuminated from the light guide 16. The outer lens 18 is formed in a plate shape having a thickness direction in the front-rear direction, and is formed in a shape slightly curved toward the front side on progression toward the center of the outer lens 18 (centroid when viewed from the front side). The outer lens 18 is formed with an outer edge profile of an elliptical shape corresponding to that of the light guide main body 16A when viewed from the front. The outer peripheral edge portion of the outer lens 18 is fixed to a front side end portion of the side wall portion 12B of the housing 12. This accordingly enables the open-end side of the housing 12 to be closed off by the outer lens 18. The light source 14 is disposed at a position corresponding to the centroid of the outer lens 18 when the outer lens 18 is viewed from the front side.

The mask 20 is a light blocking layer provided between the outer lens 18 and the light guide 16 to prevent transmission of light from a range of the outer lens 18 different from the defined range of the outer lens 18. In the present exemplary embodiment, the mask 20 is formed along the rear side face of the outer lens 18. In the present exemplary embodiment, the mask 20 is provided in a range different from the portions of the outer lens 18 that emit light (these being portions at the outer peripheral portion 18A of the outer lens 18 and portions that emit light so as to depict the characters "TR" in the inner peripheral portion 18B of the outer lens 18). Note that the characters "TR" formed by the mask 20 and the characters "TR" formed by the undulating-profile portion 16C as described above, are configured so as to be superimposed on each other in the front-rear direction. The surface area viewed from the front side of the characters "TR" formed by the undulating-profile portion 16C is wider than the surface area viewed from the front side of the characters "TR" formed by the mask 20. Namely, the size of the characters "TR" formed by the undulating-profile portion 16C is larger than the size of the characters "TR" formed by the mask 20. Moreover, the light source 14 is disposed at a position hidden by the mask 20 when the outer lens 18 is viewed from the front.

Next, description follows regarding operation and advantageous effects of the present exemplary embodiment.

As illustrated in FIG. 1 to FIG. 3, in the light emitting emblem 10 of the present exemplary embodiment described above, the light illuminated from the light source 14 is guided from the central projection 16F of the light guide 16 into the light guide main body 16A.

Part of the light of the light source 14 guided by the light guide main body 16A is reflected at the first reflection face S1 of the tapered face 16E of the taper indentation 16D, and reaches the undulating-profile portion 16C provided to an inner peripheral portion of the light guide main body 16A. The light that has reached the undulating-profile portion 16C is mostly reflected toward the front side, and is transmitted through locations of the inner peripheral portion 18B of the outer lens 18 not formed with the mask 20. The inner peripheral portion 18B of the outer lens 18 accordingly emits light so as to depict the characters "TR".

Moreover, another part of the light of the light source 14 guided by the light guide main body 16A is reflected at the second reflection face S2 of the tapered face 16E of the taper indentation 16D, and reaches the inclined face 16B at the outer peripheral portion of the light guide main body 16A. Moreover, the light that has reached the inclined face 16B is mostly reflected toward the front side, for transmission through locations of the outer peripheral portion 18A of the outer lens 18 not formed with the mask 20. This means that the outer peripheral portion 18A of the outer lens 18 emits light so as to depict an elliptical ring shape.

In this manner, the light emitting emblem 10 of the present exemplary embodiment is able to eliminate a need to provide both the light source 14 to obtain the light to be emitted at the inner peripheral portion 18B of the outer lens 18, and a separate light source to obtain the light to be emitted at the outer peripheral portion 18A of the outer lens 18. As a result, the number of the light sources 14 can be reduced. In particular, light can be emitted in the present exemplary embodiment from both the inner peripheral portion 18B of the outer lens 18 and the outer peripheral portion 18A of the outer lens 18 by the single light source 14. Note that there is an interrelation between the surface area of the first reflection face S1 and the surface area of the second reflection face S2, and the surface area of the portion where light is emitted at the inner peripheral portion 18B of the outer lens 18 and the surface area of the portion where light is emitted at the outer peripheral portion 18A of the outer lens 18.

Moreover in the present exemplary embodiment, due to adopting the light guide 16 of the configuration described above, the light from the light source 14 is able to reach the defined range of the outer lens 18. This means that there is no need to provide a member, such as a diffusing lens, between the outer lens 18 and the light guide 16 to diffuse light from the light source 14. A thinner front-rear direction dimension of the light emitting emblem 10 can be realized as a result thereof.

Moreover, in the present embodiment, the undulating-profile portion 16C that reflects light reflected from the first reflection face S1 toward the outer lens 18 side is formed to the light guide main body 16A. Such a configuration is able to suppress development of uneven brightness at a portion where light is emitted so as to depict the characters "TR" in the outer lens 18, compared to a configuration in which the undulating-profile portion 16C is not formed to the light guide main body 16A.

Moreover, in the present exemplary embodiment, the light source 14 is disposed at a position corresponding to the centroid of the outer lens 18 when viewed from the outer lens 18 side. Such a configuration is able to suppress development of uneven brightness in light transmitted at positions of the outer lens 18 at a distance from the light source 14, compared to a configuration in which the light source 14 is provided at a different position to the above position.

Furthermore, in the present exemplary embodiment, the light source 14 is disposed at a position hidden by the mask 20 when viewed from the outer lens 18 side. This configuration enables light from the light source 14 to be suppressed from being seen directly from the outer lens 18 side. Namely, the portion corresponding to the light source 14 when viewed from the outer lens 18 side can be suppressed from appearing as a bright flash.

Note that an example has been described in the present exemplary embodiment in which the light source 14 is disposed at a position hidden by the mask 20 when viewed from the outer lens 18 side, however the present disclosure is not limited thereto. For example, in cases in which there is a desire for part of the outer lens 18 to flash brightly, a configuration may be adopted in which the light source 14 is disposed at a position not hidden by the mask 20 when viewed from the outer lens 18 side.

Moreover, although an example has been described in the present exemplary embodiment in which the light source 14 is disposed at a position corresponding to the centroid of the outer lens 18 when viewed from the outer lens 18 side, the present disclosure is not limited thereto. For example, in cases in which there is a desire to provide a gradation to light illuminated from the outer lens 18, a configuration may be adopted in which the light source 14 is disposed at a position different from the position corresponding to the centroid of the outer lens 18 when viewed from the outer lens 18 side.

Moreover, although an example has been described in the present exemplary embodiment in which the undulating-profile portion 16C, which reflects light reflected at the first reflection face S1 toward the outer lens 18 side, was formed to the light guide main body 16A, the present disclosure is not limited thereto. Whether or not to form the undulating-profile portion 16C at the light guide main body 16A may be appropriately set in consideration of permissible brightness unevenness.

Moreover, although an example has been described in the present exemplary embodiment in which light is emitted by the single light source 14 from both the inner peripheral portion 18B of the outer lens 18 and the outer peripheral portion 18A of the outer lens 18, the present disclosure is not limited thereto. For example, a configuration may be adopted in which plural light sources 14 are disposed collected together.

Moreover, although an example has been described in the present exemplary embodiment in which the first reflection face S1 and the second reflection face S2 are provided with the above configurations, the present disclosure is not limited thereto. The surface area and angle of the first reflection face S1, and the surface area and angle of the second reflection face S2, may be set as appropriate in consideration of the design and the like to be formed by the light illuminated from the outer lens 18. Moreover, depending on the design and the like to be formed by the light illuminated from the outer lens 18, a configuration may be provided with three or more reflection faces such as the first reflection face S1 and the second reflection face S2.

Although the present disclosure has been described by way of an exemplary embodiment, the present disclosure is not limited thereby, and obviously various other embodiments may be implemented within a scope not departing from the spirit of the present disclosure.

What is claimed is:

1. A light emitting emblem, comprising:

a light source;

a light guide that guides light irradiated from the light source; and an outer lens that emits light by transmitting light irradiated from the light guide, wherein:

the light guide is provided with a first reflection face that reflects light from the light source passing through an inner peripheral portion of the light guide for transmission through an inner peripheral portion of the outer lens, and a second reflection face that is provided at a position different from that of the first reflection face and that reflects light from the light source passing through an outer peripheral portion of the light guide for transmission through an outer peripheral portion of the outer lens;

the light guide is provided with a taper indentation open at a front side, an inner peripheral face of the taper indentation configuring a tapered face that narrows on progression toward a light source side;

a rear-side portion of the tapered face configures the first reflection face, and a front-side portion of the tapered face configures the second reflection face;

a mask is provided on the outer lens to prevent transmission of light from a second range of the outer lens which is different from a first range of the outer lens; and an undulating-profile portion is provided at a site on the light guide facing the first range to reflect light, which has been reflected at the first reflection face, toward an outer lens side.

2. The light emitting emblem of claim 1, wherein light from a single one of the light source is guided in the light guide.

3. The light emitting emblem of claim 2, wherein the light source is disposed at a position corresponding to a centroid of the outer lens when viewed from the outer lens side.

4. The light emitting emblem of claim 3, wherein:

the light source is disposed at a position corresponding to the second range when viewed from the outer lens side.

* * * * *